United States Patent [19]

Moertel

[11] 4,442,583

[45] Apr. 17, 1984

[54] SHEARING SLIDE FASTENER CHAIN

[75] Inventor: George B. Moertel, Conneautville, Pa.

[73] Assignee: Talon, Inc., Meadville, Pa.

[21] Appl. No.: 401,777

[22] Filed: Jul. 26, 1982

[51] Int. Cl.³ ............... B21D 53/50; A41H 37/06
[52] U.S. Cl. ................................. 29/408; 29/33.2; 29/766
[58] Field of Search ............... 29/408, 409, 410, 33.2, 29/766, 769, 770, 434, 445

[56] References Cited

U.S. PATENT DOCUMENTS

| | | | |
|---|---|---|---|
| 3,750,260 | 8/1973 | Jakob | 29/766 |
| 4,238,880 | 12/1980 | Takahashi | 29/766 |
| 4,292,733 | 10/1981 | Iimura | 29/766 |
| 4,392,291 | 7/1983 | Iai | 29/766 |

*Primary Examiner*—Mark Rosenbaum
*Assistant Examiner*—Steven E. Nichols
*Attorney, Agent, or Firm*—Anthony A. O'Brien

[57] ABSTRACT

Lengths of slide fastener chain are pulled through a shearing station wherein the slide fastener chain is subjected to vibratory shearing at least partially in a direction parallel to the plane of the tapes whereby operating resistance of the chain is substantially reduced.

15 Claims, 11 Drawing Figures

SHEARING SLIDE FASTENER CHAIN

TECHNICAL FIELD

The present invention relates to slide fasteners and their manufacture, and particularly to the manufacture of slide fastener chain employing interlocking coupling elements mounted on inner edges of textile support tapes and which are opened and closed by movement of a slider.

BRIEF DESCRIPTION OF THE PRIOR ART

The prior art contains many types of slide fasteners employing interlocking coupling elements mounted on the inner edges of a pair of planar support tapes. These include fasteners having elements molded on supporting threads which are woven in the inner edges of the supporting tapes, spiral slide fasteners wherein the coupling elements are formed by convolutions of spirals of monofilament which are woven in the edges of the tapes, round coil ladder slide fasteners wherein the coupling elements are formed by convolutions of coils of monofilaments which are sewn to inner edges of the tapes, metal slide fasteners wherein metal fastening elements are crimped onto the inner edges of the tapes, molded slide fasteners wherein polymer coupling elements are molded directly onto the inner edges of the tapes, meander slide fasteners wherein meander patterns of monofilament are sewn upon one or both sides of inner edges of the tapes, and many other types of slide fasteners. In use, the slide fastener chains are opened and closed by movement of a slider on the coupling elements. The amount of force to move the slider, or the resistance to movement of the slider, is called the operating force of the slide fastener. In the manufacture of slide fasteners in the prior art, lubrication has been applied to the coupling elements in order to decrease the operating force of the slide fastener. Additonally it has been known that repeated use of the slider in opening and closing of the chain will result in some reduction of the operating force. Flexing of slide fastener chains in directions perpendicular to the tapes of the chains has been performed in the prior art by passing the chains between beaters to reduce operating resistance.

SUMMARY OF THE INVENTION

The invention is summarized in a method of manufacturing a slide fastener chain comprising the steps of forming a length of slide fastener chain having a pair of support tapes and a pair of rows of interlocking fastening elements secured on inner edges of the tapes, moving the length of slide fastener chain through a shearing station, and shearing the interlocking fastening elements and inner edges of the tapes as the slide fastener chain passes through the shearing station so as to substantially lower operating resistance of the slide fastener chain, the shearing at least partially being in a direction parallel to the plane of the tapes of the slide fastener chain and crosswise to the rows of interlocking fastening elements.

An object of the invention is to manufacture a slide fastener chain having substantially reduced operating force or resistance.

Another object of the invention is to rigorously shear a slide fastener chain with interlocking fastening elements secured on the inner edges of the tape so as to lower operating resistance of the slide fastener chain.

One feature of the invention is that shearing of a slide fastener chain rubs engaging lateral surfaces of opposing fastening elements against each other to smooth the engaging lateral surfaces and thus lower operating resistance.

Another feature of the invention is that shearing of a slide fastener chain results in stretching, relaxation, and repositioning of supporting tape portions so that ease of operating the slide fastener is greatly improved.

One advantage of the invention is that previously difficult-to-operate slide fasteners, such as larger types formed from stiffer materials, are rendered substantially easier to operate.

Other objects, advantages and features of the invention will be apparent from the following description of the preferred embodiments taken in conjunction with the accompanying drawings.

DESCRIPTION OF THE PREFERRED EMBODIMENT

Figure 1:
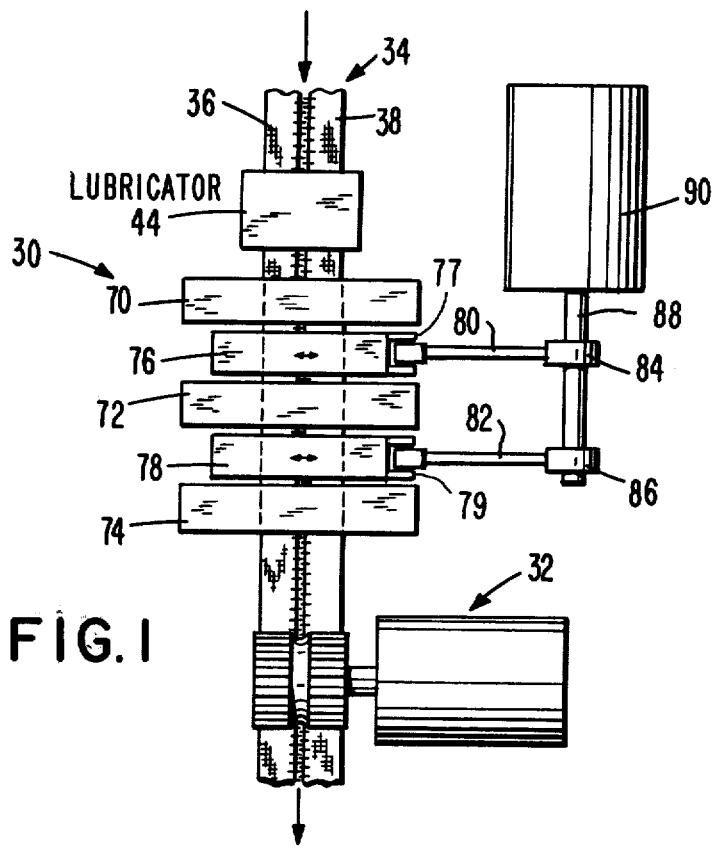
FIG. 1 is a plan view of an apparatus for shearing a slide fastener chain in accordance with the invention.

As illustrated in FIG. 1, one embodiment of an apparatus for shearing a continuous length of slide fastener chain in accordance with the invention includes a shearing station, indicated generally at 30, and a pulling mechanism, indicated generally at 32, for pulling the slide fastener chain, indicated generally at 34, through the shearing station 30. The slide fastener chain 34 is a conventional slide fastener chain having textile tapes 36 and 38 with rows of interlocking coupling elements 40 and 42, FIGS. 4 and 5, mounted on the respective tapes 36 and 38. Optionally a conventional lubricator 44 may be mounted upstream from the shearing station 30 for applying lubrication to the coupling elements 40 and 42.

The slide fastener chain 34 is manufactured in continuous lengths by conventional techniques prior to the shearing. For the example illustrated in FIGS. 4-7 the stringer formed by the tape 36 and the coupling elements 40 is substantially a mirror image of the stringer formed by the tape 38 and the coupling elements 42. The coupling elements 40 are polymer elements which have leg portions 50 and 52 molded on respective pairs of spaced connecting threads 54 and 56. Initially the elements 40 are molded in a flat condition on the threads 54 and 56 with the leg portions 50 and 52 extending in a straight line in opposite directions from the head portion 58, and with the connecting threads 54 and 56 embedded in the leg portions 50 and 52 adjacent to the heels of the leg portions. Subsequently the leg portions 50 and 52 are folded together with an invested cord 60 being positioned between diverging inner surfaces of the leg portions 50 and 52; these inner surfaces being substantially flat and joined at the heels from which the inner surfaces diverge toward respective opposite sides of the head 58. After the folding and possibly welding of heel portions of the legs together, the train of coupling elements 40 on the connecting threads 54 and 56 is woven into an edge of the tape 36 during the weaving of the weft thread 62 with the warp threads 64 such that the weft thread 62 loops around the connecting threads 54 and 56 and the invested cord 60 between the coupling elements 40.

The present invention is also suitable for other types of slide fasteners including spiral slide fasteners having coupling elements defined by convolutions of monofilament coils woven in the edges of tapes, round coil ladder slide fasteners having fastening elements defined by convolutions of coils which are sewn to edges of tapes, metal slide fasteners wherein metal coupling elements are crimped onto edges of a tapes, molded slide fasteners wherein polymer coupling elements are molded directly onto the edges of support tapes, and meander slide fasteners wherein monofilaments formed into meander patterns forming coupling elements are sewn to the edges of a tape. Generally the present invention is useable for any conventional slide fastener employing a slider to open and close rows of fastening elements on inner edges of support tapes.

Figure 3:
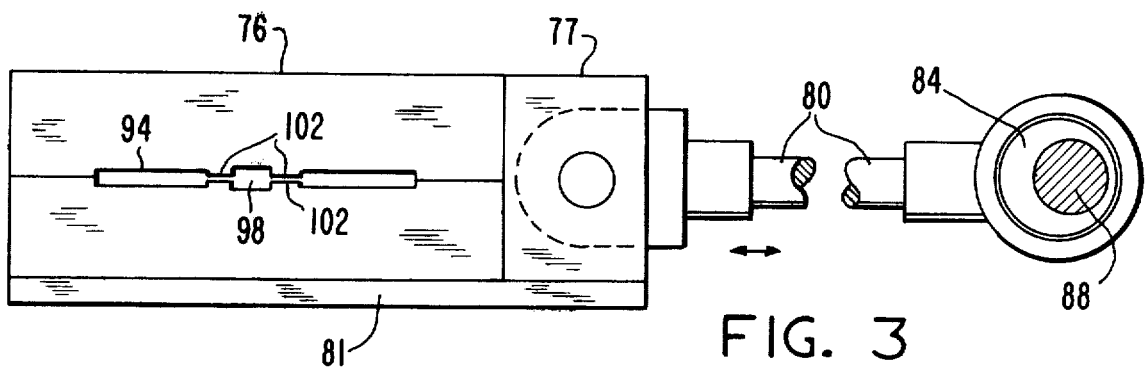
FIG. 3 is an elevation view of a movable vibrating member in the apparatus of FIG. 1.
Figure 8:
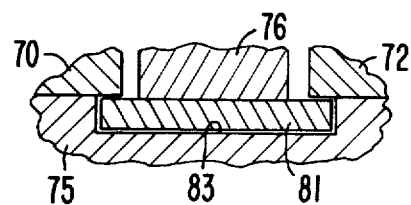
FIG. 8 is a cross-section view of a lower sliding support for the movable member of FIG. 3.

At the shearing station 30, stationary members 70, 72 and 74 are mounted on a base 75, FIG. 8, and movable members 76 and 78 are mounted on respective carriages 77 and 79, FIGS. 1, 3 and 8, which have bottom portions 81 slidable in channels 83 formed in the base 75 such that the movable member 76 is interposed between the stationary members 70 and 72 and the movable member 78 is interposed between the members 72 and 74. Links 80 and 82 are pivotally connected to the carriages 77 and 79 at one ends to the members 76 and 78 and are rotatably connected at the opposite ends to respective eccentrics 84 and 86 on a shaft 88 driven by a motor 90 for linearly oscillating the movable members 76 and 78 in a direction parallel to the plane of the tapes 36 and 38 and perpendicular to the longitudinal dimension of the slide fastener chain 34.

Figure 2:
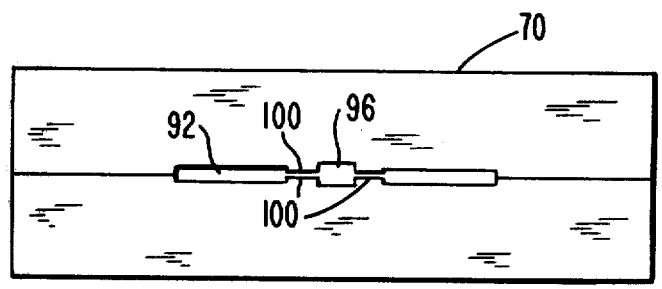
FIG. 2 is an elevation view of a stationary member in the apparatus of FIG. 1.

The stationary members 70, 72 and 74 are substantially similar while the movable members 76 and 78 are also substantially similar. The members 70, 72, 74, 76 and 78 are elongated in a horizontal direction extending perpendicular to the path of movement of the slide fastener chain 34 and, as shown in FIGS. 2 and 3, have upper and lower block halves which have channels formed in their mating surfaces to define horizontal passageways extending through the members perpendicular to the longitudinal dimension of the members for receiving and passing the slide fastener chain 34. These passageways through the members 70, 72, 74, 76 and 78 are substantially identical, are aligned when the eccentrics 84 and 86 are centered along a vertical center line through the shaft 88, and are identified by the numeral 92 for the stationary members (only on member 70 in FIGS. 4 and 5) and by numeral 94 for the movable members (only on member 76 in FIG. 3). Central portions 96 and 98 of the respective passageways 92 and 94 have cross sections slightly larger than the interlocking coupling elements 40 and 42 so as to permit the coupling elements to freely pass therethrough but to maintain the horizontal orientation of the coupling elements 40 and 42 as they are pulled through the passageways 96 and 98 and to engage the heels of the fastening element legs during oscillatory movement of the members 76 and 78 to shear the slide fastener chain. Land areas 100 and 102 on the respective stationary blocks 70, 72 and 74 and movable blocks 76 and 78 extend contiguous to the central passage portions 96 and 98 on both the upper and lower halves of the members for forming relatively narrow passageway portions for freely passing inner longitudinal portions of the tapes 36 and 38 adjacent to the heels of the fastening elements of the slide fastener chain but preventing these inner longitudinal portions of the tapes 36 and 38 from buckling in the narrow passageway portions. These land areas 100 and 102 forming the narrow tape passages are such that the inner portions of the tapes are forced to absorb fastener shear forces without vertical displacement or buckling.

The term "shear" or "shearing" as used herein refers to the displacement of a section of slide fastener chain relative to an adjacent section of slide fastener chain in a direction transverse to the slide fastener chain so that a portion of the slide fastener chain joining the adjacent sections is contorted without significant destructive deformation of the interlocking coupling elements 40 and 42 under compressive loadings caused by the vibration stroke and without breakage or deleterious stretching of connecting threads 54 and 56, invested cords 60, warp threads 64, or weft thread 62. In accordance with the present invention, the shearing, or relative displacement of adjacent sections, must be at least partially in a direction parallel to the plane of the tapes of the slide fastener chain.

Figure 5:
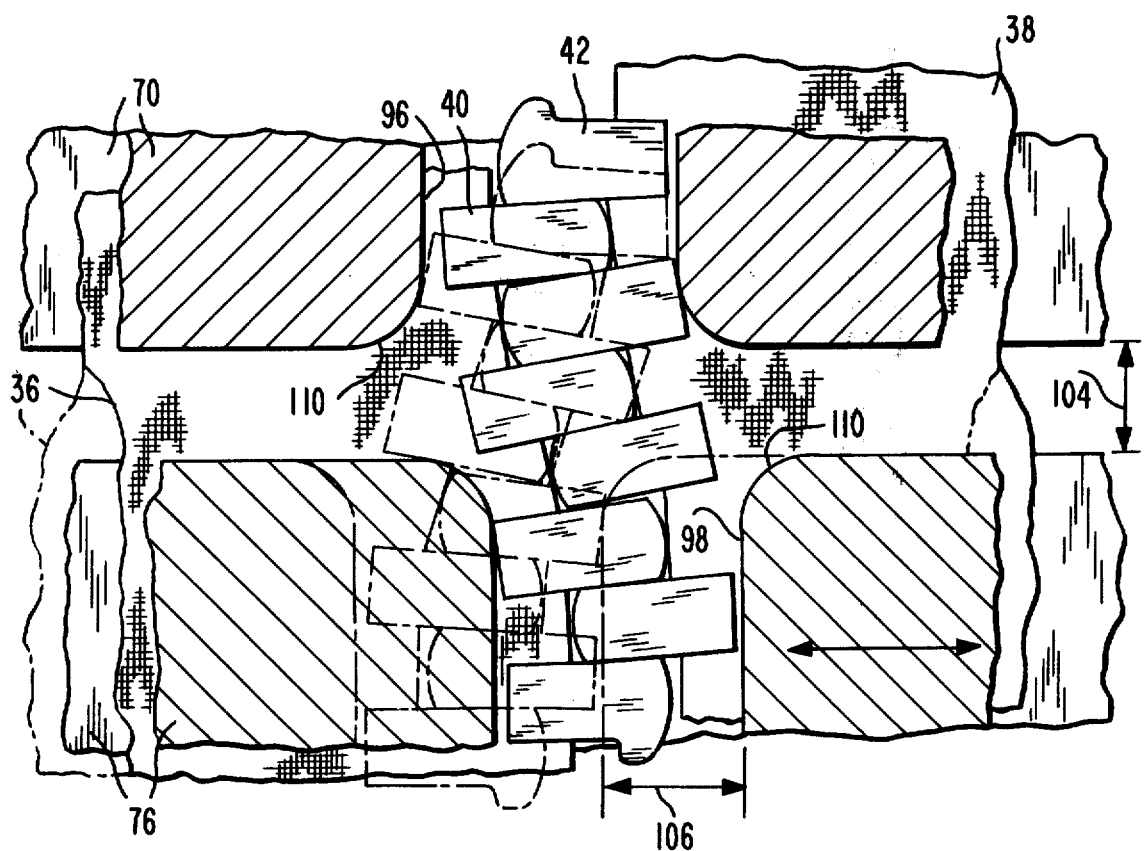
FIG. 5 is horizontal section view of a broken-away portions of adjoining stationary and vibrating members.

As shown in FIG. 5, there exists a spacing 104 between the stationary member 70 and the movable member 76; substantially similar spacing existing between the movable member 76 and the stationary member 72 as well as on the opposite sides of the movable member 78 from the stationary members 72 and 74. The distance of movement during vibration of the movable member 76 is illustrated by the arrow 106; the movable member 78 having a substantially similar length of movement. Vertically extending edges 110 of the members 70, 72, 74, 76 and 78 defining entrances and exits from the central passageway portions 96 and 98 are rounded. The spacing 104, the length of movement 106, and the radius of rounded corners 110 are selected so as to produce a desired displacement or shearing of the elements 40 and 42 and the inner supporting portions of the tapes 36 and 38 between the stationary members 70, 72 and 74 and the movable members 76 and 78 without substantial destructive deformation of the elements 40 and 42, and without breakage of the warp threads 64, the weft thread 62, the connecting threads 54 and 56, and invested cord 60. The relative speeds of the pulling mechanism 32 and the vibrating shaft 88 are selected to produce a desired repetition in shearing or contortion of every portion of the slide fastener chain 34 passing through the station 30 in at least two opposite directions, e.g. to the right and to the left as viewed in FIG. 5.

Figure 4:
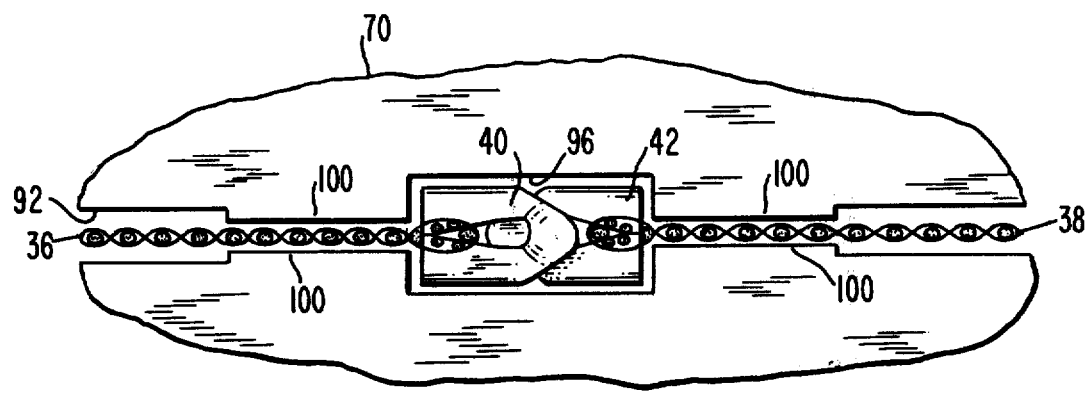
FIG. 4 is an enlarged view of a broken-away portion of the stationary member of FIG. 2 with a slide fastener chain therein.

In operation of the apparatus of FIG. 1 to shear the slide fastener chain 34, the pulling mechanism 32 is operated to pull the slide fastener chain through the shearing station 30. Prior to entering the shearing station 30, the lubricator 44 applies a lubricant to the coupling elements 40 and 42. The motor 90 rotates the shaft 88 operating the eccentrics 84 and 86 to vibrate the movable members 76 and 78 along horizontal axes perpendicular to the direction of movement of the chain 34 and parallel to the plane of the slide fastener tapes 36 and 38. As seen in FIGS. 4 and 5, the sidewalls of the central passageway portion 98 in the movable members 76 and 78 engage the heels of the coupling elements 40 and 42 as the members 76 and 78 oscillate to displace the coupling elements within the passageway 98 to the left (shown in phantom in FIG. 5) relative to the coupling elements in the passageway 96. This results in a repeated shearing of successive sections of the coupling element chain 34 in opposite directions extending parallel to the plane of the tapes 36 and 38 and perpendicular to the longitudinal dimension of the tapes.

The shearing of the slide fastener chain 34 in at least two directions while passing through the shearing station 10 produces a substantial reduction in the operating force required for a slider to open and close the slide fastener chain. This shearing causes the following: deformation of any flash which may be extending along the connecting threads between coupling elements; reduction of textile thread stiffness in the areas supporting the coupling elements; smoothing of sharpness or roughness on lateral mating coupling element surfaces, i.e. surfaces extending perpendicular to the edges of the tapes, by rubbing the engaging lateral surfaces of opposing elements against each other to permit them to slide past each other more easily; and repositioning of textile components to lower operating force.

Figure 6:
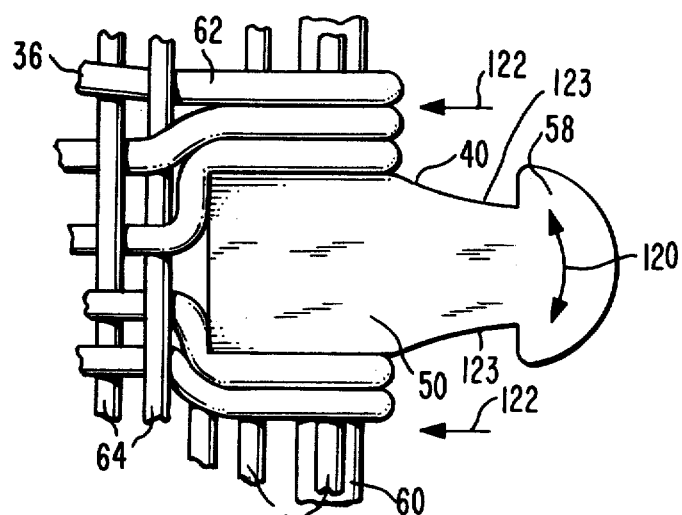
FIG. 6 is a plan view of a slide fastener element and portion of textile supporting tape for being sheared in accordance with the invention.
Figure 7:
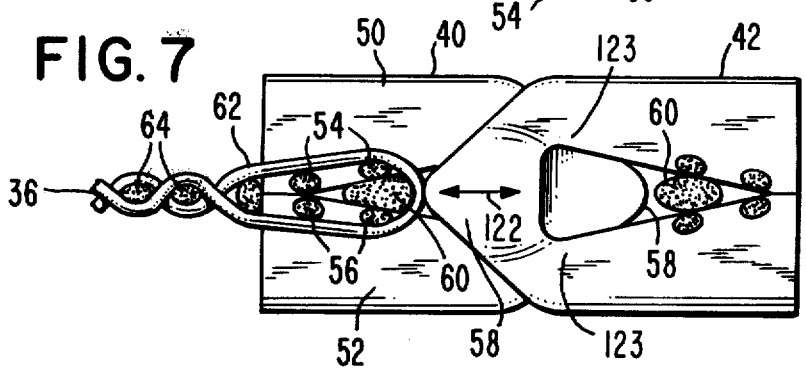
FIG. 7 is a sectional view of a pair of interlocking coupling elements for being sheared in accordance with the invention.

As shown in FIGS. 6 and 7 the vibratory shearing movement causes relative pivotal movement of the coupling element 40 in a direction as shown by the arrow 120 about an axis perpendicular to the tapes and the connecting threads; this pivotal movement produces sharp bending or contortion of the connecting threads 54 and 56 and warp threads 64 in the plane of the tapes 36 and 38 to reduce textile thread stiffness. Sharp bending of the connecting threads 54 and 56 at their entrance to the legs 50 and 52 of the fastening elements deforms molding flash away from the connecting threads to produce easier pivotal movement of the coupling element during later operation of the slide fastener chain. Repeated contortion of the inner portions of the tapes results in repositioning and/or deformation of fibers to render the textile tapes more flexible. Additionally some stretching of the connecting threads 54 and 56 and the invested cord 60 may occur to enable easier operation.

Relative movement between opposing elements 40 and 42 in the direction of arrow 122, FIG. 7, causes engaging lateral surfaces or edges 123 of the elements 40 and 42 to rub against each other to smooth sharp edges and roughness and to render subsequent relative movement easier thus resulting in reduced operating resistance. In the molded elements of FIGS. 6 and 7, the edges 123 bordering the center eye or opening are sharper than 90° due to draft of the molding cavities used in molding the fastening elements 40 and 42. The relative movement between elements 40 and 42 rounds these sharp edges.

Additionally as shown by the arrows 122, the movement of the mating head portions cause compaction of the cord 60 toward the heel portions of the elements; this results in easier pivotal movement of the head portions 58 of the coupling elements since the cords 60 are closer to the heels and the axes of pivotal movement for the coupling elements during operation.

Figure 9:
FIG. 9 is an elevational view of a movable member illustrating a second variation of movement thereof.
Figure 10:
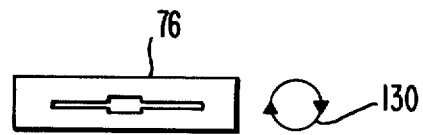
FIG. 10 is an elevational view of a movable member illustrating a third variation of movement thereof.
Figure 11:
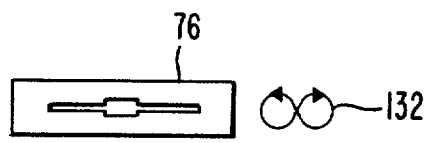
FIG. 11 is an elevational view of a movable member illustrating a fourth variation of the movement thereof.

Although they preferred method and apparatus employs vibration of the interlocking chain of coupling elements linearly in the plane of the tapes, other directions of vibratory movement having a component of direction parallel to the plane of the tapes can be used. In slide fastener chains of the type shown in FIGS. 4–7, it has been found that shearing in opposite linear directions parallel to the plane of the tapes and perpendicular to the longitudinal dimension of the tapes produces a reduction in operating resistance which is about ten times greater than a reduction produced by shearing in linear directions perpendicular to the plane of the tapes. It is believed that any shear motion having a substantial component of motion in a direction parallel to the plane of the tapes will produce similar reductions in operating resistance. Examples of some other possible shear motions are shown by the arrows 128, 130 and 132 in FIGS. 9, 10 and 11. In FIGS. 9 and 10 the movable members are moved in a circular direction; the movement 128 in FIG. 9 being oscillatory while the rotary movement 130 in FIG. 10 is continuous in one direction. A combination of linear and rotary motion, i.e. curvilinear motion, may be imparted to the movable members as shown for example by the "lazy 8" movement in FIG. 11.

It is to be understood that many alternative types of apparatus other than the members 70, 72, 74, 76 and 78 and vibrating means shown in the drawings might be used to generate the shearing or flexing motion. Methods employing gear forms to engage the slide fastener chain, or series of rollers, etc., may be used.

Since many modifications, variations and changes in detail may be made to the above described embodiments, it is intended that all matter described in the foregoing description and shown in the accompanying drawings be interpreted as illustrative and not in a limiting sense.

What is claimed is:

1. A method of manufacturing a slide fastener chain comprising the steps of
   forming a length of slide fastener chain having a pair of support tapes and a pair of rows of interlocking fastening elements secured on inner edges of the tapes,
   moving the length of slide fastener chain through a shearing station, and
   shearing the interlocking fastening elements and inner edges of the tapes as the slide fastener chain passes through the shearing station so as to substantially lower operating resistance of the slide fastener chain,
   said shearing at least partially being in a direction parallel to the plane of the tapes of the slide fastener chain and crosswise to the rows of interlocking fastening elements.

2. A method as claimed in claim 1 wherein the shearing includes alternately shearing the the slide fastener chain in at least two opposite directions chain passes through the shearing station.

3. A method as claimed in claim 2 wherein the shearing includes passing the slide fastener chain sequentially through a stationary guide and a movable guide, and oscillating the movable guide to thereby shear successive segments of the slide fastener chain passing through the movable guide and the stationary guide.

4. A method as claimed in claim 1 or 2 wherein the shearing includes rubbing of lateral surfaces of opposing fastening elements, said lateral surfaces being surfaces extending transverse to the edges of the respective tapes.

5. A method as claimed in claim 4 wherein the shearing includes pivoting of the elements about axes transverse to the tapes and transverse to the inner edges of the tapes.

6. A method as claimed in claim 4 wherein the slide fastening elements are molded on connecting threads woven in the inner edges of the tapes, and the pivoting includes sharp bending of the connecting threads contiguous to the fastening elements.

7. A method as claimed in claim 6 wherein each of the fastening elements include a pair of leg portions having flat inner surfaces joined at heels of the leg portions and diverging toward opposite sides of a head portion of each fastening element with an invested cord woven longitudinally in the inner edge of each tape and extending between the inner diverging surfaces of the legs of the fastening elements, and the shearing includes forcing the head portions of opposing fastening elements against the inner edges of the respective tapes to compact the invested cords toward the heels.

8. A method as claimed in claim 2 or 3 wherein the shearing of the slide fastener chain is linear in the plane of the tapes of the slide fastener chain.

9. A method as claimed in claim 2 or 3 wherein the shearing is circular.

10. A method as claimed in claim 2 or 3 wherein the shearing is curvilinear.

11. An apparatus for shearing a length of slide fastener chain which includes a pair of support tapes having respective inner edges and a pair of rows of interlocking fastening elements secured on the respective inner edges of the support tapes, the apparatus comprising
a shearing station,
means for pulling the length of slide fastener chain through the shearing station, and
said shearing station including means for shearingly displacing successive sections of the slide fastener chain relative to adjacent sections of the slide fastener chain passing through the shearing station wherein the displacing is at least partially parallel to the plane of the tapes.

12. An apparatus as claimed in claim 11 wherein the displacing means includes means for vibrating the section of slide fastener chain at the shearing station in a direction along the plane of the tapes of the slide fastener chain.

13. An apparatus as claimed in claim 11 or 12 wherein the displacing means includes a stationary member having a passageway for receiving and guiding the slide fastener chain, a movable member disposed adjacent to the stationary member and having a passageway formed therethrough for receiving and passing the slide fastener chain, and means for vibrating the movable member relative to the stationary member such that successive sections of the slide fastener chain passing through the movable member are shearingly displaced relative to adjacent sections of the slide fastener chain passing through the stationary member.

14. An apparatus as claimed in claim 13 wherein the displacing means comprises at least three stationary members, and at least two movable members interspaced between the stationary members, said vibrating means vibrating the at least two movable members.

15. An apparatus as claimed in claim 13 wherein the passageways in the stationary member and the movable member each include a central passageway portion configured to confine and pass the pair of rows of interlocking fastening elements, and outer passageway portions for receiving and guiding the pair of support tapes, each of said stationary and movable members including land areas forming narrow tape passage portions in the respective passageway contiguous and on opposite sides of each central passageway portion so as to prevent buckling of the tape portions in the narrow tape passage portions.

* * * * *